United States Patent Office 3,501,462
Patented Mar. 17, 1970

3,501,462
17-CYCLOPROPYL STEROIDS
Robert G. Christiansen, Schodack, and John W. Dean, Sand Lake, N.Y., assignors to Sterling Drug Inc., New York, N.Y., a corporation of Delaware
No Drawing. Filed May 2, 1966, Ser. No. 546,514
Int. Cl. C07c *173/10, 169/20, 169/08*
U.S. Cl. 260—239.5
25 Claims

ABSTRACT OF THE DISCLOSURE 17-cyclopropyl steroids of the androstane and estrane series, having hormonal properties, are prepared by reacting the appropriate 17-oxo-steroids with cyclopropyllithium to give 17-cyclopropyl-17-hydroxy-steroids, which can then be dehydrated to produce 17-cyclopropyl-16,17-unsaturated steroids.

---

This invention relates to novel steroid compounds, and in particular is concerned with steroids of the androstane and estrane series bearing a cyclopropyl group in the 17-position, and processes for the preparation thereof.

The invention sought to be patented resides in the concept of a composition of matter having a molecular structure in which there is attached a cyclopropyl group to the 17-position of a steroid nucleus of the androstane or estrane series, which also possesses either a 17-hydroxy group or a double bond in the 16,17-position.

The tangible embodiments of the composition aspect of the invention possess the inherent general physical properties of being colorless crystalline solids, substantially insoluble in water and of varying solubility in organic solvents. Examination of the compounds of the invention reveals, upon ultraviolet, infrared and NMR spectrographic analysis, data confirming the molecular structures assigned to the compounds. These data, taken together with the nature of the starting materials, modes of synthesis and results of elementary analysis, positively confirm the structures of the compositions sought to be patented.

The tangible embodiments of the invention possess the inherent applied use characteristics of exerting hormonal effects, as evidenced by endocrinological evaluation according to standard procedures. Thus, tangible embodiments show estrogenic, myotrophic, progestational, pituitary inhibiting and hypocholesteremic activity.

The basic structure of the compounds of the invention are of the following general formulae:

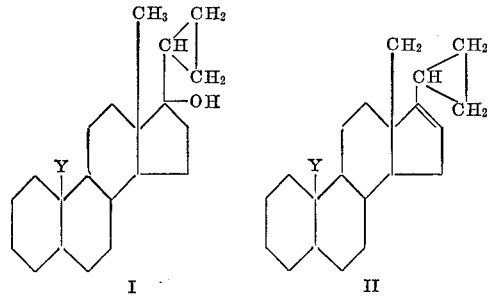

wherein Y is methyl (androstane series) or hydrogen (estrane series). The steroid nucleus can contain one or more double bonds, for example in the 1,2-, 3,4-, 5(10)-, 5,6-, 6,7-, 7,8-, 8,9-, 9(10)-, 9,11-, 14,15-, or 15,16-positions; and one or more substituent groups commonly encountered in the steroid art, viz. lower-alkyl groups, especially methyl groups, for example, at the 2-, 4-, 6-, 7-, 11-, or 16-positions; oxo, hydroxy, lower-alkoxy or acyloxy groups, for example, at the 2-, 3-, 6-, 7-, 11-, 12-, 14-, 15-, or 16-positions; or halogen atoms, for example, in the 2-, 4-, 6-, 9-, 11-, or 16-positions. When acyloxy groups are present the acyl moieties are preferably derived from carboxylic acids having from one to twelve carbon atoms. When lower-alkoxy groups are present they preferably have from one to six carbon atoms.

A preferred aspect of the invention comprises 17α-cyclopropyl-17-hydroxy steroids or 17-cyclopropyl-16,17-unsaturated steroids, having hydrogen or methyl in the 10-position, from one to five double bonds in rings A and B, and either (A) an oxygen function at the 3-position selected from the group consisting of oxo, hydroxy and acyloxy, or (B) a heterocyclic ring fused to the 2,3-position, for instance [2,3-d]isoxazole, [3,2-c]pyrazole, [3,2-d]pyrimidine, and [2,3-d]-2′-aminothiazole.

The compounds of Formula I above are prepared by reacting the appropriate 17-oxo compound with cyclopropyllithium in an inert solvent under anhydrous conditions. Other reactive functional groups in the steroid molecule can be protected by conventional means; for example, reactive oxo groups, as in the 3-position, can be protected in the form of an enamine or a ketal. The predominant product produced is the one in which the cyclopropyl group assumes the α-position and the hydroxy group the β-position, although both possible epimers are contemplated.

The compounds of Formula II above are prepared by dehydration of the compounds of Formula I. The dehydration can be effected by heating the 17-hydroxy compound with an acid anhydride, thionyl chloride or the like dehydrating agent.

The following examples will further illustrate the invention without the latter being limited thereby.

EXAMPLE 1

(a) Cyclopropyllithium

Lithium wire (1.95 g., 0.28 mole) was wiped free of oil, cut into short lengths (5 mm. or less) and added to 75 ml. of anhydrous ether in an atmosphere of nitrogen. The mixture was stirred while cooling to 0° C., and a solution of 15.72 g. (0.13 mole) of bromocyclopropane in 50 ml. of anhydrous ether was slowly added over a period of one hour. The reaction mixture was stirred for two hours at 0° C., filtered through a plug of glass wool, and the solution then used immediately in the following reaction.

(b) 17α-cyclopropyl-4-androsten-17β-ol-3-one

To the cyclopropyllithium solution obtained above at 0° C. was added a solution of 11.4 g. (0.0325 mole) of the 3-(pyrrolidyl enamine) of 4-androstene-3,17-dione in 200 ml. of freshly-dried tetrahydrofuran. The reaction mixture was refluxed for about sixteen hours under nitrogen, 20 ml. of water then added, and the mixture concentrated to dryness. To the residue was added 200 ml. of methanol, 16 g. of sodium acetate, 40 ml. of water and 16 ml. of acetic acid. This mixture was refluxed for four hours, then concentrated to a small volume, and 200 ml. of 2 N hydrochloric acid and 10 ml. of concentrated hydrochloric acid were added. The mixture was extracted with methylene dichloride (several portions totalling 400 ml.), and the extracts were washed with dilute sodium hydroxide, water and then dried and concentrated. The residue was dissolved in methylene dichloride and chromatographed on a column of 300 g. of silica gel. The column was eluted with n-pentane containing 25–50% ether and the resulting product was then recrystallized from acetonitrile to give 5.24 g. of 17α-cyclopropyl-4-androsten-17β-ol-3-one in the form of colorless rods, M.P. 160.4–161.0° C. (corr.), $[\alpha]_D^{25} = +70.2°$ (1% in chloroform); ultraviolet maximum at 242 mμ ($\epsilon = 16,700$).

EXAMPLE 2

17α-cyclopropyl-3-methoxy-1,3,5(10)-estratrien-17β-ol

A solution of cyclopropyllithium (prepared from 15.75 g. of cyclopropyl bromide as described above in Example 1, part (a)) and 11.37 g. of estrone methyl ether in 125 ml. of dry tetrahydrofuran was refluxed for about sixteen hours. The reaction mixture was partially cooled and 100 ml. of saturated Rochelle salt solution was added. The organic and aqueous phases were separated and the organic layer washed with 50 ml. of 2 N hydrochloric acid, 25 ml. of saturated sodium bicarbonate solution, water, and saturated sodium chloride solution. The combined aqueous layers were back-extracted with ether, and the ether extracts washed with sodium chloride solution and combined with the original ether solution which was then dried over anhydrous sodium sulfate and concentrated to dryness. The residue was dissolved in methylene dichloride and chromatographed on 300 g. of aluminum oxide. The column was eluted with pentane containing 10–60% ether. The later fractions brought out the desired product which was recrystallized from acetonitrile to give 17α-cyclopropyl-3-methoxy-1,3,5(10)-estratrien-17β-ol in the form of colorless rods, M.P. 119.2–120.6° C. (corr.); $[\alpha]_D^{25}=+44.3°$ (1% in chloroform); infrared absorption at 2.78, 3.25, 3.35, 3.42, 3.50, 6.23, 6.32, 6.66, 6.84 and 8.09μ.

According to the methods of Examples 1 and 2, the following transformations can be effected:

| Starting material | Final product |
| --- | --- |
| Equilenin methyl ether | 17α-cyclopropyl-3-methoxy-1,3,5,(10),6,8-estrapentaen-17β-ol. |
| Estrone | 17α-cyclopropyl-1,3,5(10)-estratriene-3,17β-diol. |
| Equilin | 17α-cyclopropyl-1,3,5(10),7-estratetraene-3,17β-diol. |
| 5-androsten-3β-ol-17-one | 17α-cyclopropyl-5-androstene-3β,17β-diol. |
| 5α-androstan-3β-ol-17-one | 17α-cyclopropyl-5α-androstane-3β,17β-diol. |
| 5β-androstan-3β-ol-17-one | 17α-cyclopropyl-5β-androstane-3β,17β-diol. |
| 5α-androstane-3β,11β-diol-17-one | 17α-cyclopropyl-5α-androstane-3β,11β,17β-triol. |
| 5α-androstane-3β,16α-diol-17-one | 17α-cyclopropyl-5α-androstane-3β,16α,17β-triol. |
| 5-androsten-2α-ol-17-one | 17α-cyclopropyl-5-androstene-2α,17β-diol. |
| 3α-fluoro-5α-androstan-17-one | 17α-cyclopropyl-3α-fluoro-5α-androstan-17β-ol. |
| 3-(pyrrolidyl enamine) of 9α-fluoro-4-androstene-3,11,17-trione. | 17α-cyclopropyl-9α-fluoro-4-androsten-17β-ol-3,11-dione. |

EXAMPLE 3

17α-cyclopropyl-3-methoxy-2,5(10)-estradien-17β-ol

17α-cyclopropyl-3-methoxy-1,3,5(10)-estratrien-17β - ol (14.92 g., 45.7 millimoles) was dissolved in 1100 ml. of absolute ether. The system was flushed out with nitrogen and 1400 ml. of liquid ammonia was introduced. Lithium wire (14.0 g. in 2" pieces) was then added over a period of thirty minutes, followed by 320 ml. of absolute ethanol over a period of thirty minutes. The reaction mixture was heated gently to accelerate the evaporation of the ammonia, and 500 ml. of ether was then added followed by one liter of ice water. The organic and aqueous phases were separated, the aqueous layer back-extracted with 250 ml. of ether, and the combined ether solutions were washed with water and sodium chloride solution, dried over anhydrous sodium sulfate and concentrated to dryness. The residue was recrystallized from hexane to give 11.50 g. of 17α-cyclopropyl-3-methoxy-2,5(10)-estradien-17β-ol in the form of colorless rods, M.P. 125.0–130.0° C. (corr.); $[\alpha]_D^{25}=+94.0°$ (1% in chloroform).

EXAMPLE 4

17α-cyclopropyl-5(10)-estren-17β-ol-3-one

To a solution of 7.0 g. of 17α-cyclopropyl-3-methoxy-2,5(10)-estradien-17β-ol in 50 ml. of tetrahydrofuran (freshly percolated through alkaline alumina) and 100 ml. of methanol was added a solution of 4.6 g. of oxalic acid dihydrate in 35 ml. of water. The reaction mixture was kept at room temperature for fifty minutes, then diluted with 650 ml. of water and washed with 100 ml. of sodium bicarbonate solution, water, and sodium chloride solution. The washings were repeated and the ether solution dried over anhydrous sodium sulfate, filtered and concentrated to a small volume. Some hexane was added and the evaporation continued until crystallization began. There was thus obtained 6.25 g. of product which was recrystallized from a hexane-ethyl acetate mixture to give 17α-cyclopropyl-5(10)-estren-17β-ol-3-one in the form of colorless prisms, M.P. 150.0–152.0° C. (corr.); $[\alpha]_D^{25}=+156.4°$ (1% in chloroform).

17α-cyclopropyl-5(10)-estren-17β-ol-3-one was alternatively prepared by causing 5.7 g. of 3-methoxy-2,5(10)-estradien-17-one to react with cyclopropyllithium (from 7.9 g. of cyclopropyl bromide) according to the procedure described above in Example 1, part (b).

EXAMPLE 5

17α-cyclopropyl-4-estren-17β-ol-3-one.

To a solution of 2.0 g. of 17α-cyclopropyl-5(10)-estren-17β-ol-3-one in 75 ml. of dry methanol at room temperature was added 1.0 ml. of 8% aqueous sodium hydroxide solution. The reaction, folowed by thin layer chromatography, was complete in thirty minutes, and the mixture was neutralized with a few drops of acetic acid and concentrated at room temperature to a low volume. The rsidue was dissolved in ether, washed with dilute sodium hydroxide, water, and sodium chloride solution, dried over anhydrous sodium sulfate and concentrated to dryness. The residue was recrystallized from an ether-hexane mixture to give 17α-cyclopropyl-4-estren-17β-ol-3-one in the form of colorless prisms, M.P. 130.8–132.0° C. (corr.), or as colorless laths, M.P. 145.8–147.2° C. (corr.); $[\alpha]_D^{25}=+13.7°$ (1% in chloroform); ultraviolet maximum at 241 mμ ($\epsilon=17,600$).

EXAMPLE 6

(a) 17α-cyclopropyl-4-estrene-3β,17β-diol.

A solution of 6.29 g. of 17α-cyclopropyl-4-estren-17β-ol-3-one in 125 ml. of tetrahydrofuran was stirred at room temperature and 12.4 g. of lithium aluminum hydride tritertiary-butoxide [LiAlH(O—t—Bu)₃] was added. The reaction mixture was stirred at room temperature for ninety minutes and water was added cautiously to destroy excess reagent. The mixture was added to 2.5 liters of cold water, neutralized with acetic acid, and the product collected by filtration. The product was stirred with 200 ml. of methylene dichloride, then filtered and the filtrate concentrated to dryness. The residue was recrystallized from ethyl acetate and then from an acetone-hexane mixture to give 17α-cyclopropyl-4-estrene-3β,17β-diol in the form of colorless micro-needles, M.P. 139.0–155.8° C. (corr.); $[\alpha]_D^{25}=+1.4°$ (1% in chloroform).

(b) 3β-acetoxy-17α-cyclopropyl-4-estren-17β-ol.

17α-cyclopropyl-4-estrene-3β,17β-diol (1.0 g.) was warmed gently with 2.0 ml. of pyridine and 1.0 ml. of acetic anhydride until completely dissolved. The reaction mixture was kept overnight at room temperature and then added to 300 ml. of water. The solid product was collected by filtration and recrystallized from aqueous methanol to give 3β-acetoxy-17α-cyclopropyl-4-estren-17β-ol in the form of a monohydrate, colorless plates, M.P. 96.0–107.8° C. (dec., corr.); $[\alpha]_D^{25}=+43.5°$ (1% in chloroform).

By replacing the acetic anhydride in the foregoing preparation by amolar equivalent amount of propionic anhydride, caproyl chloride, dodecanoyl chloride, succinic anhydride, benzoyl chloride, p-nitrobenzoyl chloride, cinnamoyl chloride, β-phenylpropionyl chloride, β-cyclohexylpropionyl chloride, or phenoxyacetyl chloride, there can be obtained, respectively, 3β-propionyloxy-17α-cyclopropyl-4-estren-17β-ol,
3β-caproyloxy-17α-cyclopropyl-4-estren-17β-ol,
3β-dodecanoyloxy-17α-cyclopropyl-4-estren-17β-ol,
3β-(β-carboxylpropionyloxy) - 17α-cyclopropyl - 4-estren-17β-ol,
3β-benzoyloxy-17α-cyclopropyl-4-estren-17β-ol,
3β-(p-nitrobenzoyloxy)-17α-cyclopropyl-4-estren - 17β-ol,
3β-cinnamoyloxy-17α-cyclopropyl-4-estren-17β-ol,
3β-(β-phenylpropionyloxy)-17α-cyclopropyl - 4 - estren-17β-ol,
3β-(β-cyclohexylpropionyloxy)-17α - cyclopropyl - 4 - estren-17β-ol, or
3β-phenoxylacetoxy-17α-cyclopropyl-4-estren-17β-ol.

EXAMPLE 7

17α-cyclopropyl-5(10)-estrene-3,17β-diol was prepared from 3.15 g. of 17α-cyclopropyl-5(10)-estren-17β-ol-3-one and 2.16 g. of lithium aluminum hydride tritertiary-butoxide according to the procedure described above in Example 6, part (a). The product was recrystallized from an acetone-hexane mixture and then from acetone alone to give 17α-cyclopropyl-5(10)-estrene-3,17β-diol as a mixture of epimers, colorless microneedles, M.P. 127–130° C. (uncorr.); $[\alpha]_D^{25}=+128.9°$ (1% in chloroform).

EXAMPLE 8

17α-cyclopropyl-4,9(10)-estradien-17β-ol-3-one

A solution of 6.29 g. of 17α-cyclopropyl-5(10)-estren-17β-ol-3-one in about 150 ml. of pyridine was stirred at 4–5° C. and cooled in an ice bath while 6.7 g. of pyridinium bromide perbromide was added in small portions over a period of thirty minutes. Pyridine (30 ml.) was then added, the mixture stirred for thirty minutes, allowed to come to room temperature and stirred for forty-five minutes longer. The reaction mixture was added to water and extracted with methylene dichloride-ether (1:1). Additional methylene dichloride was added to the extracts and the latter were washed four times with 100 ml. portions of 2 N hydrochloric acid and then with water. The organic extracts were concentrated and the residue was boiled down with benzene and ethyl acetate, and then triturated with ethyl acetate. The solid product was collected, dissolved in n-hexane and chromatographed on 200 g. of silica gel. The column was eluted with hexane containing 25–40% of ether and the resulting material was recrystallized from ether to give 2.50 g. of 17α-cyclopropyl-4,9(10)-estradien-17β-ol-3-one, M.P. 150.5–152.5° C. (uncorr.); $[\alpha]_D^{25}=-295.8°$ (1% in chloroform); ultraviolet maxima at 218 and 306 mμ (ε=5800 and 20,700); infrared absorption at 2.80, 2.91, 3.26, 3.42, 3.51, 6.05, 6.27, 6.34 and 6.89μ.

EXAMPLE 9

17-cyclopropyl-3-methoxy-1,3,5(10),16-estratetraene

A mixture of 5.0 g. of 17α-cyclopropyl-3 - methoxy-1,3,5(10)-estratrien-17β-ol (Example 2) in 25 ml. of acetic anhydride was heated on a steam bath for twenty-four hours and then refluxed for four hours. The reaction mixture was kept at room temperature overnight, then poured into cold water and made alkaline with 2 N sodium hydroxide. The mixture was extracted twice with ether, and the ether extracts were washed with water and saturated sodium chloride, dried over anhydrous sodium sulfate and concentrated to dryness. The residue was dissolved in n-pentane and chromatographed on 150 g. of silica gel. The column was eluted with pentane and pentane containing 5% ether, and the resulting product was recrystallized from acetonitrile to give 17-cyclopropyl-3-methoxy-1,3,5(10),16 - estratetraene in the form of colorless rods, M.P. 90.6–92.8° C. (corr.); $[\alpha]_D^{25}=+108.1°$ (1% in chloroform).

According to the procedure given above in Example 9, the following transformations can be effected:

| Starting material | Final product |
|---|---|
| 17α-cyclopropyl-4-androsten-17β-ol-3-one. | 17-cyclopropyl-4,16-androstadien-3-one. |
| 17α-cyclopropyl-4-estren-17β-ol-3-one. | 17-cyclopropyl-4-16-estradien-3-one |
| 17α-cyclopropyl-4-estrene-3β,17β-diol. | 3β-acetoxy-17-cyclopropyl-4,16-estradiene. |
| 17α-cyclopropyl-4,9(10)-estradien-17β-ol-3-one. | 17-cyclopropyl-4,9(10),16-estratrien-3-one. |
| 17α-cyclopropyl-3-methoxy-1,3,5(10),6,8-estrapentaen-17β-ol. | 17-cyclopropyl-3-methoxy-1,3,5(10) 6,8,16-estrahexaene. |
| 17α-cyclopropyl-1,3,5(10)-estratriene-3,17β-diol. | 3-acetoxy-17-cyclopropyl-1,3,5(10), 16-estratetraene. |
| 17α-cyclopropyl-1,3,5(10),7-estratetraene-3,17β-diol. | 3-acetoxy-17-cyclopropyl-1,3,5(10), 7,16-estrapentaene. |
| 17α-cyclopropyl-5-androstene-3β,17β-diol. | 3β-acetoxy-17-cyclopropyl-5,16-androstadiene. |
| 17α-cyclopropyl-5α-androstane-3β,17β-diol. | 3β-acetoxy-17-cyclopropyl-5α-androst-16-ene. |
| 17α-cyclopropyl-5β-androstane-3β,17β-diol. | 3β-acetoxy-17-cyclopropyl-5β-androst-16-ene. |
| 17α-cyclopropyl-5α-androstane-3β,11β,17β-triol. | 3β,11β-diacetoxy-17-cyclopropyl-5α-androst-16-ene. |
| 17α-cyclopropyl-5α-androstane-3β,16α,17β-triol. | 3β,16α-diacetoxy-17-cyclopropyl-5α-androst-16-ene. |
| 17α-cyclopropyl-5-androstene-2α,17β-diol. | 2α-acetoxy-17-cyclopropyl-5,16-androstadiene. |
| 17α-cyclopropyl-3α-fluoro-5α-androstan-17β-ol. | 17-cyclopropyl-3α-fluoro-5α-androst-16-ene. |
| 17α-cyclopropyl-9α-fluoro-4-androsten-17β-ol-3,11-dione. | 17-cyclopropyl-9α-fluoro-4,16-androstadiene-3,11-dione. |

EXAMPLE 10

(a) 17-cyclopropyl-3-methoxy-1,3,5(10)-estratriene-16,17-diol 16-(3-chlorobenzoate)

To a solution of 3.1 g. of 17-cyclopropyl-3-methoxy-1,3,5(10),16-estratetraene in 30 ml. of methylene dichloride at 0° C. was added 2.05 g. of 85% 3-chloroperbenzoic acid in 20 ml. of methylene dichloride. The reaction mixture was stirred at 0° C. for one hour, then filtered and the filtrate concentrated to dryness. The residue was recrystallized from acetonitrile to give 1.70 g. of 17-cyclopropyl-3-methoxy-1,3,5(10)-estratriene-16,17-diol 16-(3-chlorobenzoate), M.P. 191.5–192.5° C. (uncorr.); ultraviolet maxima at 230, 281 and 288 mμ (ε=1260, 2150 and 200); infrared absorption at 2.81, 2.95, 3.42, 3.47, 3.57, 5.87, 6.00, 6.23, 6.36, 6.65, 6.81, 6.87 and 7.02μ.

(b) 17-cyclopropyl-3-methoxy-1,3,5(10)-estratriene-16,17-diol

A mixture of 5.8 g. of 17-cyclopropyl-3-methoxy-1,3,5(10)estratriene - 16,17-diol 16-(3-chlorobenzoate) and 300 ml. of absolute ethanol was heated to boiling, 2 N sodium hydroxide (15 ml.) was added and the boiling continued for thirty minutes. The reaction mixture was cooled, concentrated to a small volume, added to 1 liter of cold water and made neutral with acetic acid. After standing for a few hours, the solid product was collected and recrystallized from ether to give 3.60 g. of 17-cyclopropyl-3-methoxy-1,3,5(10)-estratriene - 16,17-diol in the form of colorless micro-rods, M.P. 137.0–138.0° C. (corr.).

EXAMPLE 11

2-hydroxymethylene-17α-cyclopropyl-4-estren-17β-ol-3-one

To a solution of 12.6 g. of 17α-cyclopropyl-4-estren-17β-ol-3-one in 150 ml. of dry benzene was added 40 ml. of ethyl formate. The reaction vessel was flushed out with nitrogen and 6.5 g. of sodium methoxide was added. The reaction mixture was stirred for three and one-half hours, an additional 15 ml. of ethyl formate was added and stirring continued overnight. Water (100 ml.) was added, the mixture stirred for thirty minutes and the organic and aqueous phases separated. The aqueous phase was washed with ether and acidified with carbon dioxide. The gum which formed was obtained by decantation, dissolved in dilute sodium hydroxide and reprecipitated with carbon dioxide. The amorphous product was collected by filtration, washed with water and dried to give 2-hydroxymethylene-17α-cyclopropyl - 4-estren-17β-ol-3-one; ultraviolet maxima at 248 and 307 mμ (ε=10,400 and 4500).

By replacing the 17α-cyclopropyl-4-estren-17β-ol-3-one in the foregoing preparation with 17α-cyclopropyl-4,9(10)-estradien-17β-ol-3-one (Example 8) or 17α-cyclopropyl-4-androsten-17β-ol-3-one (Example 1), there can be obtained 2-hydroxymethylene - 17α-cyclopropyl-4,9(10)-estradien-17β-ol-3-one or 2-hydroxymethylene-17α-cyclopropyl-4-androsten-17β-ol-3-one, respectively.

EXAMPLE 12

17α-cyclopropyl-17β-hydroxy-4-estreno[2,3-d]isoxazole

To a solution of 4.1 g. of 2-hydroxymethylene-17α-cyclopropyl - 4-estren-17β-ol-3-one in 25 ml. of warm acetic acid was added a solution of 3.27 g. of sodium acetate trihydrate and 0.85 g. of hydroxylamine hydrochloride in 5 ml. of water. The reaction mixture was kept at room temperature for ninety minutes, then poured into 1.5 liters of cold water and neutralized with sodium hydroxide. The product was collected by filtration, washed, dried and recrystallized from ether to give 17α-cyclopropyl-17β-hydroxy-4-estreno[2,3-d]isoxazole in the form of pale yellow crystals, M.P. 137–139° C. (uncorr.); $[\alpha]_D^{25} = -77.4°$ (1% in chloroform).

Similarly, 2-hydroxymethylene - 17α-cyclopropyl-4,9(10)-estradien-17β-ol-3-one or 2-hydroxymethylene-17α-cyclopropyl-4-androsten-17β-ol-3-one can be reacted with hydroxylamine to give 17α-cyclopropyl - 17β-hydroxy-4,9(10)-estradieno[2,3-d]isoxazole or 17α-cyclopropyl-17β-hydroxy-4-androsteno[2,3-d]isoxazole, respectively.

EXAMPLE 13

2-hydroxymethylene-17α-cyclopropyl-5(10)-estren-17β-ol-3-one

To a solution of 6.30 g. of 17α-cyclopropyl-5(10)-estren-17β-ol-3-one in 75 ml. of dry benzene was added 10 ml. of ethyl formate and the mixture was stirred at room temperature over nitrogen. Sodium methoxide (1.08 g.) was added and stirring continued at room temperature for forty-five minutes. The reaction mixture was added to ether and water, shaken, and the ether and water layers separated. The aqueous phase was acidified with carbon dioxide and the solid product collected by filtration and recrystallized from ethyl acetate to give 2-hydroxymethylene - 17α-cyclopropyl - 5(10)-estren-17β-ol-3-one in the form of pale yellow prisms, M.P. 207.0–208.0° C. (corr.).

EXAMPLE 14

17α-cyclopropyl-17β-hydroxy-5(10)-estreno[3,2-c]pyrazole

A solution of 3.4 g. of 2-hydroxymethylene-17α-cyclopropyl-5(10)-estren-17β-ol-3-one and 2.5 ml. of hydrazine hydrate in 50 ml. of absolute ethanol was kept at room temperature for several hours. The reaction mixture was concentrated to dryness and the residue recrystallized first from ethyl acetate and then from an acetonitrile-methylene dichloride mixture to give 17α-cyclopropyl-17β-hydroxy-5(10)-estreno[3,2-c]pyrazole in the form of tan plates, M.P. 220–221° C. (dec., uncorr.); $[\alpha]_D^{25} = +94.2°$ (1% in chloroform); ultraviolet maximum at 223 mμ ($\epsilon$=4750).

Similarly, 2 - hydroxymethylene - 17α - cyclopropyl-4,9(10)-estradien-17β-ol-3-one or 2-hydroxymethylene-17α-cyclopropyl-4-androsten-17β-ol-3-one can be reacted with hydrazine to give 17α-cyclopropyl-17β-hydroxy-4,9(10)-estradieno[3,2-c]pyrazole or 17α - cyclopropyl - 17β - hydroxy-4-androsteno[3,2-c]pyrazole.

EXAMPLE 15

17α - cyclopropyl - 17β - hydroxy-4-estreno[3,2-c]pyrazole was prepared from 2-hydroxymethylene-17α-cyclopropyl-4-estren-17β-ol-3-one and hydrazine hydrate according to the procedure described above in Example 14. The product was chromatographed on Florisil (activated magnesium silicate) and eluted with benzene containing 5–30% ether. The resulting product was recrystallized from aqueous isopropyl alcohol and from aqueous ethanol to give a compound containing water of crystallization which was dried at 76° C. in high vacuum for six hours to give 17α-cyclopropyl-17β-hydroxy-4-estreno[3,2-c]pyrazole, M.P. 143–148° C. (uncorr.).

2 - hydroxymethylene - 17α - cyclopropyl - 4 - estren-17β-ol-3-one can also be caused to react with formamidine or acetamidine by heating in the presence of triethylamine in absolute ethanol solution to give, respectively, 17α-cyclopropyl - 17β - hydroxy-4-estreno[3,2-d]pyrimidine or 17α - cyclopropyl - 17β - hydroxy - 4 - estreno[3,2-d] - 2'-methylpyrimidine.

17α-cyclopropyl-4-estren-17β-ol-3-one can be brominated to give the 2-bromo derivative, and the latter can be caused to react with thiourea in methyl ethyl ketone solution to give 17α - cyclopropyl - 17β - hydroxy - 4 - estreno [2,3-d]-2'-aminothiazole.

We claim:
1. A 17-cyclopropyl steroid of the androstane or estrane series additionally having a 17-hydroxy group or 16,17-unsaturation in the steroid nucleus.
2. 17-cyclopropyl-3-R-1,3,5(10)-estratrien - 17 - ol, according to claim 1, wherein the steroid nucleus is 3-R-1,3,5(10)-estratrien-17-ol, wherein R is hydroxy or lower-alkoxy.
3. A compound according to claim 2 wherein R is methoxy.
4. 17-cyclopropyl - 3 - lower-alkoxy-2,5(10)-estradien-17-ol, according to claim 1, wherein the steroid nucleus is 3-lower-alkoxy-2,5(10)-estradien-17-ol.
5. 17-cyclopropyl-5(10)-estren-17-ol-3-one, according to claim 1, wherein the steroid nucleus is 5(10)-estren-17-ol-3-one.
6. 17-cyclopropyl-4-estren-17-ol-3-one, according to claim 1, wherein the steroid nucleus is 4-estren-17-ol-3-one.
7. 17 - cyclopropyl - 4,9(10)-estradien-17-ol-3-one, according to claim 1, wherein the steroid nucleus is 4,9(10)-estradien-17-ol-3-one.
8. A compound according to claim 1 of the formula

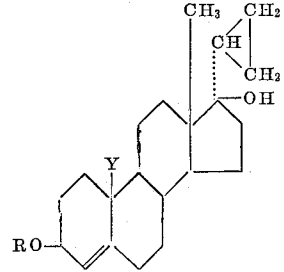

wherein R is hydrogen or carboxylic acyl having from one to twelve carbon atoms, and Y is hydrogen or methyl.
9. A compound according to claim 8 wherein R is acetyl and Y is hydrogen.
10. A compound according to claim 8 wherein R and Y are hydrogen.
11. 17-cyclopropyl-3-RO-5(10)-estren-17-ol, according to claim 1, wherein the steroid nucleus is 3-RO-5(10)-estren-17-ol, wherein R is hydrogen or carboxylic acyl having from one to twelve carbon atoms.
12. 17-cyclopropyl-3-R-1,3,5(10),16-estratetraene, according to claim 1, wherein the steroid nucleus is 3-R-1,3,5(10),16-estratetraene, wherein R is hydroxy or lower-alkoxy.
13. A compound according to claim 12 wherein R is methoxy.
14. 17-cyclopropyl-3-R-1,3,5(10)-estratriene-16,17-diol, according to claim 1, wherein the steroid nucleus is 3-R-1,3,5(10)-estratriene-16,17-diol, wherein R is hydroxy or lower-alkoxy.
15. A compound according to claim 14 wherein R is methoxy.

16. 17 - cyclopropyl - 2 - hydroxymethylene - 5(10)-estren-17-ol-3-one, according to claim 1, wherein the steroid nucleus is 2-hydroxymethylene-5(10)-estren-17-ol-3-one.

17. A compound according to claim 1 of the formula

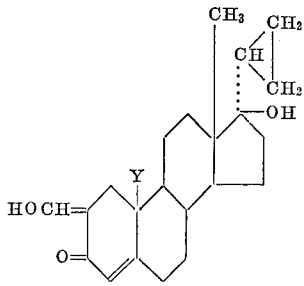

wherein Y is hydrogen or methyl.

18. 2-hydroxymethylene - 17 - cyclopropyl - 4,9(10)-estradien-17-ol-3-one, according to claim 1, wherein the steroid nucleus is 2-hydroxymethylene-4,9(10)-estradien-17-ol-3-one.

19. A compound according to claim 1 of the formula

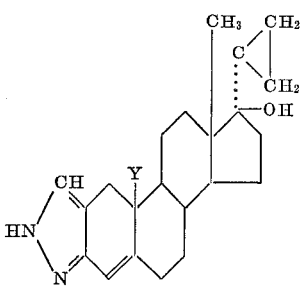

wherein Y is hydrogen or methyl.

20. 17 - cyclopropyl - 17 - hydroxy - 5(10) - estreno[3,2-c]pyrazole, according to claim 1, wherein the steroid nucleus is 17-hydroxy-5(10)-estreno[3,2-c]pyrazole.

21. 17 - cyclopropyl - 17 - hydroxy - 4,9(10) - estradieno[3,2-c]pyrazole, according to claim 1, wherein the steroid nucleus is 17-hydroxy-4,9(10)-estradieno[3,2-c]pyrazole.

22. A compound according to claim 1 of the formula

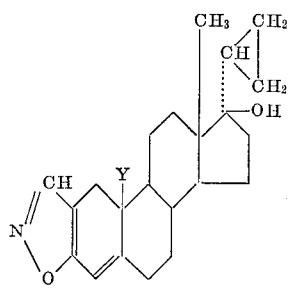

wherein Y is hydrogen or methyl.

23. 17 - cyclopropyl - 17 - hydroxy - 4,9(10) - estradieno[2,3-d]isoxazole, according to claim 1, wherein the steroid nucleus is 17-hydroxy-4,9(10)-estradieno[2,3-d]isoxazole.

24. The process for preparing a 17-cyclopropyl-17-hydroxy steroid according to claim 1 which comprises reacting a 17-oxo steroid with cyclopropyllithium.

25. The process for preparing a 17-cyclopropyl-16,17-unsaturated steroid according to claim 1 which comprises heating a 17-cyclopropyl-17-hydroxy steroid according to claim 1 with a dehydrating agent.

References Cited

Lehmann et al. "Chemische Berichte" (1965) pages 1470–1475.

ELBERT L. ROBERTS, Primary Examiner

U.S. Cl. X.R.

260—239.55, 397.3, 397.4, 397.45, 397.5, 999

PO-1050
(5/69)

UNITED STATES PATENT OFFICE
CERTIFICATE OF CORRECTION

Patent No. 3,501,462      Dated March 17, 1970

Inventor(s) Robert G. Christiansen and John W. Dean

It is certified that error appears in the above-identified patent and that said Letters Patent are hereby corrected as shown below:

Column 8, line 21, Claim 1, after "nucleus" insert:
--, selected from the group consisting of
- A. 4-estrene, 5(10)-estrene, 2,5(10)-estradiene, 1,3,5(10)-estratriene, 16-hydroxy-1,3,5(10)-estratriene, 1,3,5(10),7-estratetraene, 1,3,5(10),6,8-estrapentaene or 4-androstene
  each additionally having a 3-hydroxy, 3-lower-alkoxy or 3-acyloxy group;
- B. 4-estrene, 5(10)-estrene or 4,9(10)-estradiene,
  each additionally having a 3-oxo group;
- C. 5α-androstane or 5β-androstane
  each additionally having a 3-fluoro, 3-hydroxy or 3-acyloxy group, or 3,11 or 3,16-dihydroxy or diacyloxy groups;
- D. 4-estrene, 5(10)-estrene, 4,9(10)-estradiene or 4-androstene
  each additionally having both a 2-hydroxymethylene group and a 3-oxo group;
- E. 4-estreno, 5(10)-estreno, 4,9(10)-estradieno or 4-androsteno[3,2-c]pyrazole;
- and F. 4-estreno, 5(10)-estreno, 4,9(10)-estradieno or 4-androsteno[2,3-d]isoxazole--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents